(12) United States Patent
Blackketter et al.

(10) Patent No.: US 7,159,232 B1
(45) Date of Patent: Jan. 2, 2007

(54) SCHEDULING THE RECORDING OF TELEVISION PROGRAMS

(75) Inventors: Dean J. Blackketter, San Francisco, CA (US); Timothy F. Park, Menlo Park, CA (US); Daniel J. Zigmond, Sunnyvale, CA (US); Sharon F. Glusker, Belmont, CA (US); John Matheny, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/441,708

(22) Filed: Nov. 16, 1999

(51) Int. Cl.
*H04N 5/445* (2006.01)

(52) U.S. Cl. .............. 725/38; 725/42; 725/46; 725/58; 386/83

(58) Field of Classification Search ............... 386/83; 725/39, 40, 42, 30, 41, 36, 109, 114, 67, 68; 348/460, 473–474
See application file for complete search history.

(56) References Cited

U.S. PATENT DOCUMENTS

| | | | | |
|---|---|---|---|---|
| 4,706,121 A | | 11/1987 | Young | 358/142 |
| 4,908,713 A | | 3/1990 | Levine | 358/335 |
| 4,945,563 A | * | 7/1990 | Horton et al. | 725/110 |
| 4,977,455 A | | 12/1990 | Young | 358/142 |
| 5,247,364 A | * | 9/1993 | Banker et al. | 725/37 |
| 5,293,357 A | | 3/1994 | Hallenbeck | 348/734 |
| 5,307,173 A | | 4/1994 | Yuen et al. | 358/335 |
| 5,335,079 A | | 8/1994 | Yuen et al. | 358/335 |
| 5,515,173 A | | 5/1996 | Mankovitz et al. | 358/335 |
| 5,532,732 A | | 7/1996 | Yuen et al. | 348/1 |
| 5,796,828 A | | 8/1998 | Tsukamoto et al. | |
| 5,878,222 A | | 3/1999 | Harrison | |
| 5,880,768 A | | 3/1999 | Lemmons et al. | 348/1 |
| 6,141,488 A | * | 10/2000 | Knudson et al. | 386/83 |
| 6,157,413 A | * | 12/2000 | Hanafee et al. | 725/30 |
| 6,173,112 B1 | | 1/2001 | Gruse et al. | |
| 6,177,931 B1 | * | 1/2001 | Alexander et al. | 725/52 |
| 6,374,406 B1 | | 4/2002 | Hirata | |
| 6,442,593 B1 | | 8/2002 | Wang et al. | |
| 6,526,575 B1 | * | 2/2003 | McCoy et al. | 725/36 |
| 6,603,488 B1 | | 8/2003 | Humpleman et al. | |
| 2003/0044165 A1 | | 3/2003 | Wood et al. | |
| 2003/0079231 A1 | | 4/2003 | Hirata | |
| 2005/0160283 A1 | | 7/2005 | Hirala | |
| 2005/0273819 A1 | | 12/2005 | Knudson et al. | |
| 2006/0031883 A1 | | 2/2006 | Ellis et al. | |

FOREIGN PATENT DOCUMENTS

| WO | WO 92/22983 | * 12/1992 |
|---|---|---|
| WO | WO 99/38321 | 7/1999 |

* cited by examiner

*Primary Examiner*—Vincent F. Boccio
(74) *Attorney, Agent, or Firm*—Lee & Hayes, PLLC

(57) ABSTRACT

A television receiving system displays an advertisement for a future television program. If the future television program is identified as recordable, the system also displays an option to set a reminder for the advertised program and/or an option to record the advertised program on a video recorder. If a viewer of the advertisement selects the reminder option, then a reminder is programmed in the system. If the viewer selects the record option, then the system automatically programs the video recorder to record the advertised program. If the viewer has established an interactive session during a television advertisement, and has not completed the interactive session when the advertisement ends, then the current television program is paused until the interactive session is completed.

27 Claims, 7 Drawing Sheets

SCHEDULING THE RECORDING OF TELEVISION PROGRAMS

TECHNICAL FIELD

This invention relates to television systems that schedule future television programs for recording at the viewer's request. The television systems can also pause a television program to allow a viewer to finish entering data during an interactive session.

BACKGROUND

Various systems are available for recording a television program. For example, video cassette recorders (VCRs) allow a user to record and playback television programs. The user of the VCR may watch the television program while it's being recorded and save the recorded program for future viewing. Alternatively, the VCR user may program the VCR to record a television program while the user is away or watching a different television program. The recorded program is then viewed at a later time.

Another type of video recording device is a digital video recorder (DVR). A DVR may also be referred to as a personal video recorder or a personal television server. A DVR records television programs on a disk drive (or other random access storage device) instead of a video tape. Typically the disk drive is not removable from the recorder and provides greater storage capacity than a conventional video tape. For example, a video tape may provide six hours of storage capacity while a DVR may provide twenty or more hours of storage capacity. The DVR can read from and write to any portion of the disk drive in a random manner. This capability allows the DVR to record one television program while simultaneously reading a recorded television program. Additionally, the DVR allows a user to begin viewing a recorded program while the program is still being recorded. For example, the viewer may program the DVR to record a particular television program that is one hour in length. Twenty minutes after the program has started, the viewer begins watching the recorded program from the beginning. While the viewer is watching the beginning of the program, the DVR continues recording the remainder of the program.

Many television programs include commercials that advertise various products and services, including other television programs. Typically, an advertised television program is scheduled for broadcast at a future time. If the viewer of the advertised television program wants to watch or record the television program, they need to remember the date, time, and channel of the television program or set a recording device, such as a VCR or a DVR, to record the television program. When programming a device to record the television program, the viewer needs to remember (or make a written note of) the date, time, channel, and duration of the television program to properly program the recorder. Although a viewer wants to watch an advertised television program, they may forget when the program is scheduled to be broadcast or may forget to program their recorder, thereby missing the program.

Existing systems, such as VCR Plus+® allow a viewer to enter a particular program code that corresponds to a particular television program. The program code identifies the date, time, and television channel associated with the particular television program. Program codes may be obtained, for example, from a television program guide or other television program listing. Although this system simplifies the VCR programming process, the viewer must first locate the appropriate program code and enter the program code into the VCR. If the viewer forgets to enter the program code or accidentally enters the wrong program code, the desired television program will not be recorded.

In an interactive television system, the television viewer is able to interact with the television broadcasting system by participating in polls, playing along with game shows, or requesting information from advertisers. In certain situations, the responses provided by the viewer may disrupt the viewer's enjoyment of the television program. For example, the viewer of a television program may desire additional information regarding a product advertised in a commercial. The viewer requests additional information by pressing an appropriate button on a remote control device or on the interactive television device. In response to the viewer's request for additional information, the broadcasting system may request information from the viewer, such as name, address, email address, telephone number, and the specific type of information desired. While the viewer is providing the requested information (e.g., by typing or otherwise entering data into the interactive television system), the commercial may end and the broadcasting system resumes broadcasting the television program. At this point, the viewer must either continue entering data and miss a portion of the television program or abandon the request for information from the advertiser and continue watching the television program.

The present invention addresses the shortcomings discussed above by automatically recording television programs or automatically programming a reminder. The above problems are also addressed by allowing a viewer to pause a television program to allow the viewer to finish entering data during an interactive session.

SUMMARY

The television system described herein provides an option to the viewer to automatically program a video recorder to record the advertised program. Thus, the viewer need not remember the date, time, or channel of the advertised program. Similarly, a reminder may be programmed automatically to remind the viewer when the advertised program is about to begin. The television system also prevents a viewer involved in an interactive session during a commercial from missing a television program if the interactive session lasts longer than the commercial.

An embodiment of the television system displays an advertisement for a future television program and displays an option to record the advertised television program if the future television program is identified as recordable. A record operation is programmed on a video recorder if a viewer selects the option to record the advertised television program.

Another embodiment of the television system displays an advertisement for a future television program and displays an option to set a reminder for the advertised television program. A reminder operation is programmed if the viewer selects the option to set a reminder for the advertised television program.

Particular embodiments of the television system decode information associated with the advertised program from a television signal containing the advertised television program.

In one embodiment of the television system, the displayed option is removed after a predetermined period of time.

In another embodiment of the television system, the displayed option is removed at the end of the advertisement.

An implementation of the television system offers to establish an interactive session with a viewer of the current television program during a television advertisement. If the viewer establishes an interactive session and has not completed the session when the television advertisement ends, then the current television program is not displayed. Instead, the current television program is recorded on a video recorder. When the viewer completes the interactive session, the recorded television program is played from the video recorder.

DETAILED DESCRIPTION

The television system described herein provides an option to the viewer of an advertisement for a future television program to automatically program a video recorder to record the advertised program. The television system also allows the viewer of the advertisement to set a reminder associated with the advertised program. Additionally, the television system pauses a television program, if necessary, to allow a viewer to finish entering data during an interactive session.

Various examples and embodiments are described herein with reference to television programs. However, the systems and procedures described herein can be used with any type of video segment and are not limited to television programs.

Figure 1:
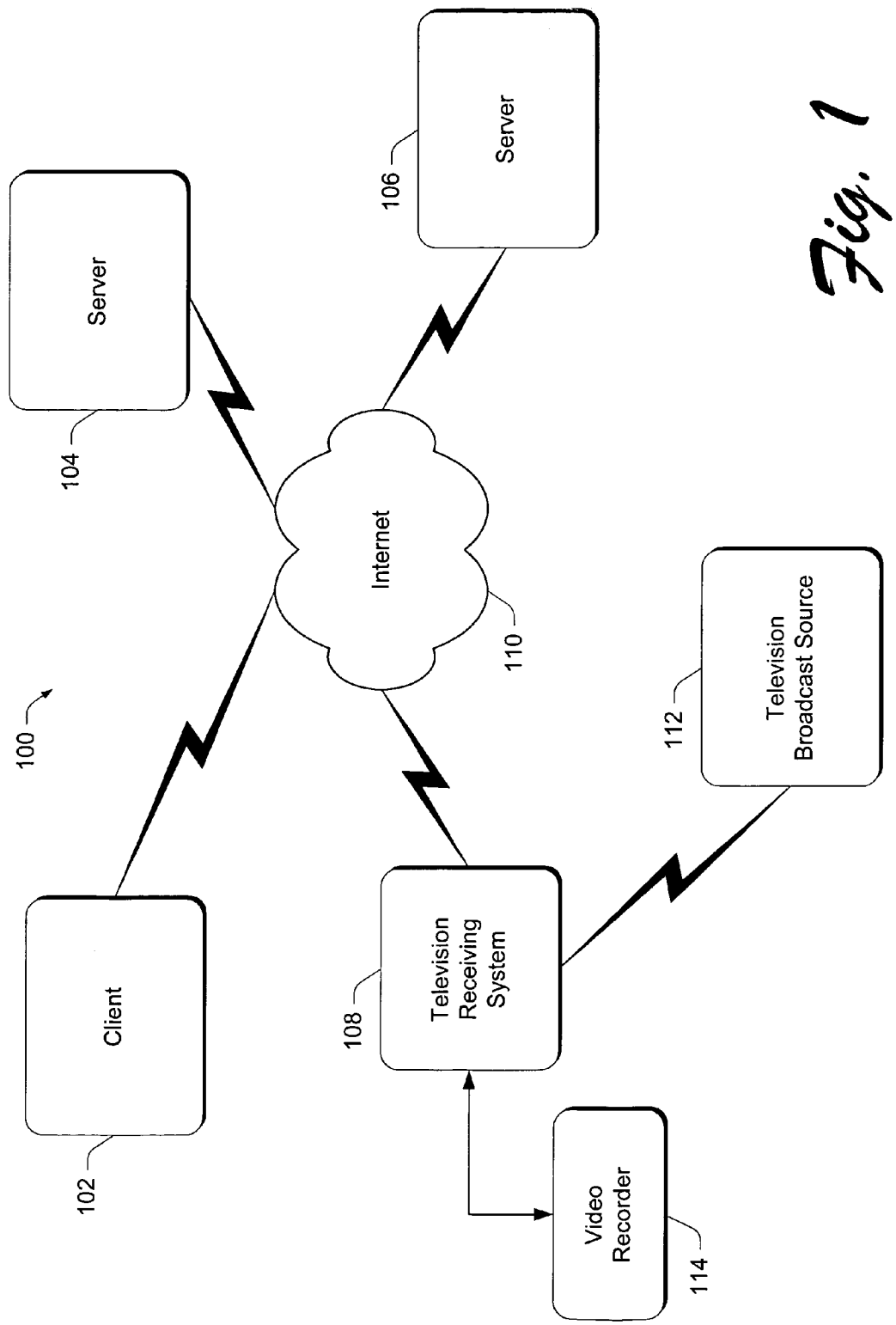
FIG. 1 illustrates an exemplary network environment in which a television receiving system transmits and receives data across the Internet and receives television signals from a television broadcast source.

FIG. 1 illustrates an exemplary network environment 100 in which a television receiving system transmits and receives data across the Internet 110 and receives television signals from a television broadcast source 112. A client 102, servers 104 and 106, and television receiving system 108 are coupled to one another through the Internet 110. Television receiving system 108 is capable of receiving various types of data from one or more devices coupled to the Internet 110. Television receiving system 108 is also coupled to television broadcast source 112, which broadcasts television signals. Television receiving system 108 may receive television signals from source 112 via cable, satellite, microwave, computer network, terrestrial (over the air) broadcast, or any other communication medium. Although not shown in FIG. 1, television broadcast source 112 may have an associated server or other device coupled to the Internet 110, which allows the source 112 to broadcast television signals via one medium (e.g., cable) and transmit other data related to the television broadcast via the Internet 110. Alternatively, television broadcast source 112 may transmit television signals as well as other data related to the television signals via the Internet 110.

Television receiving system 108 is also coupled to a video recorder 114. Video recorder 114 may be any type of recording device capable of recording television signals onto a recordable medium. For example, video recorder 114 can be a VCR or a digital video recorder (DVR). A DVR records television programs or other information onto a disk drive or other random access storage device instead of a video tape. The DVR can read from and write to any portion of the disk drive in a random manner. This feature allows the DVR to record one television program while simultaneously reading a recorded television program. A DVR may also be referred to as a personal video recorder or a personal television server.

Figure 2:
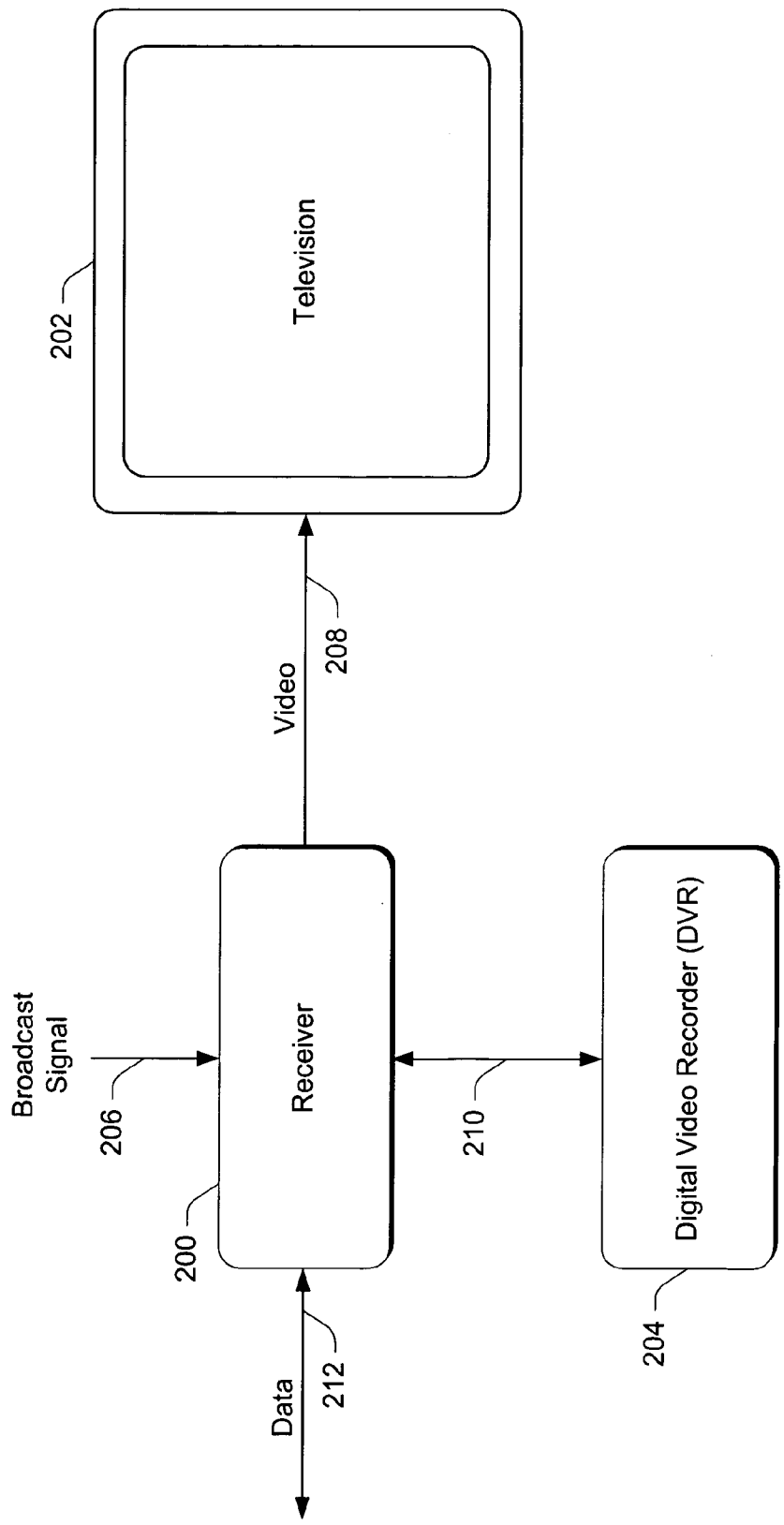
FIG. 2 illustrates an embodiment of a television receiving system.

FIG. 2 illustrates an embodiment of the television receiving system 108. A receiver 200, such as a set-top box, receives a broadcast television signal 206 from a television broadcast source (such as source 112 in FIG. 1). The receiver 200 communicates data bi-directionally on a data communication link 212. Data communication link 212 may use any type of communication medium and any communication protocol. In a particular embodiment, data communication link 212 is a telephone line that provides a data connection to the Internet or another data communication network. Receiver 200 is coupled to a DVR 204, which stores television signals and other data. Receiver 200 is also coupled to a television 202 via a video communication link 208. Video communication link may be a radio frequency (RF), s-video, composite video, component video, or other video link. Television 202 may be any type of display device or projection device using any type of display or projection technology, including projection display systems and flat panel displays. Receiver 200 receives broadcast television signal 206 and displays the received signal on television 202 and/or stores the received signal on DVR 204. Alternatively, receiver 200 may receive television signals via data communication link 212. Furthermore, additional information associated with the received television signal may be received and/or transmitted on data communication link 212. Although receiver 200, television 202, and DVR 204 are shown in FIG. 2 as separate devices, any two or more of these devices may be combined into a single device.

Figure 3:
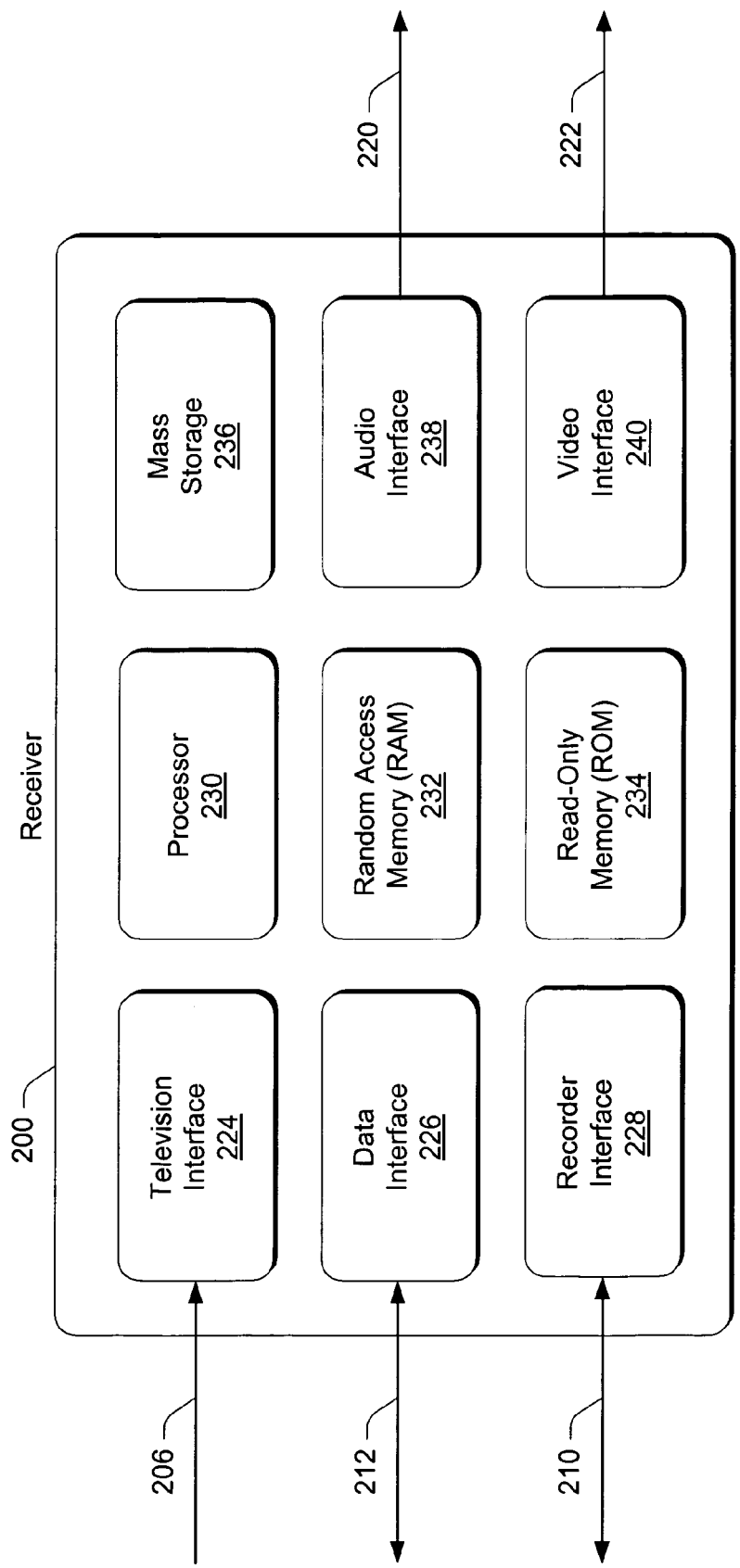
FIG. 3 is a block diagram of a receiver capable of receiving television signals and network data and generating video signals for display on a television.

FIG. 3 is a block diagram of the receiver 200 shown in FIG. 2. As discussed above, receiver 200 is capable of receiving television signals and network data and generating video signals for display on a television. Additionally, the receiver 200 can be used, for example, to perform various procedures necessary to record and play back television programs and allow a viewer to interact with the source of a television broadcast (e.g., via a data communication network). Receiver 200 includes a television interface 224, such as a television tuner, which receives the broadcast television signal 206 from a television broadcast source. A data interface 226 transmits and receives data across communication link 212, which is typically coupled to a data communication network such as the Internet. Data interface 226 typically includes a modem or other bi-directional data communication device. Receiver 200 also includes a recorder interface 228, which communicates with one or more video recorders, such as DVR 204 shown in FIG. 2, via communication link 210.

Receiver 200 includes one or more processors 230, a random access memory (RAM) 232, a read-only memory (ROM) 234, and a mass storage device 236. Processor 230 is capable of implementing the various procedures and operations discussed herein. RAM 232 and mass storage device 236 provide for the storage of data, instructions, and other information used by processor 230 during the normal operation of receiver 200. ROM 234 stores various parameters and basic operating instructions used, for example, by processor 230.

An audio interface 238 communicates audio data across an audio communication link 220. Similarly, a video interface 240 communicates video data across a video communication link 222. In a particular embodiment, audio interface 238 and video interface 240 are combined into a single audio/video interface which communicates audio and video information across an audio/video communication link. Although not shown in FIG. 3, receiver 200 may also include a remote control interface that allows a television viewer to control the functions of the receiver using a handheld remote control device.

Generally, the processor 230 of receiver 200 is programmed by means of instructions stored at different times in various computer-readable storage media of the receiver, such as RAM 232 and mass storage 236. The system described herein includes various types of computer-readable storage media when such media contains instructions or programs for implementing the steps described herein in conjunction with a processor. The system also includes the receiver itself when programmed according to the methods and techniques described herein. Alternatively, these systems can be implemented in hardware or a combination of hardware, software, and/or firmware. For example, one or more application specific integrated circuits (ASICs) could be programmed to carry out the systems and procedures discussed herein.

Figure 4:
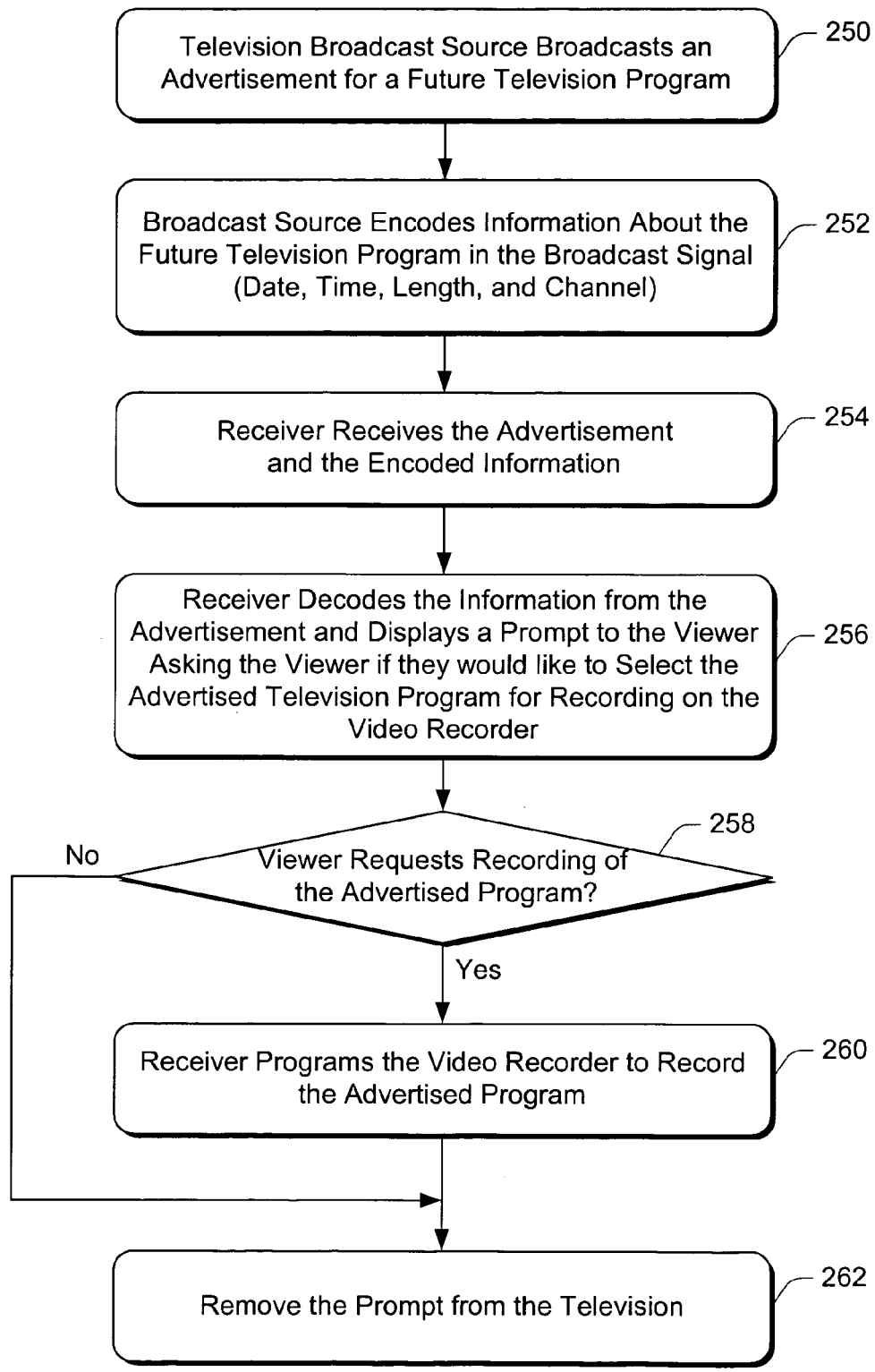
FIG. 4 is a flow diagram illustrating a procedure that allows a television viewer to program a video recorder to record an advertised television program at a future time.

FIG. 4 is a flow diagram illustrating a procedure that allows a television viewer to program a video recorder to record an advertised television program at a future time. A television broadcast source broadcasts an advertisement for a future television program (step 250). For example, during a broadcast of a first television program (the current television program), an advertisement is broadcast for a different television program that will be broadcast the following evening. The advertised program may be broadcast on the same television channel or on a different channel than the current television program. Additionally, the advertised program may be broadcast at multiple times (for example, a television program having multiple parts). If the advertised television program is recordable (i.e., information necessary to record the program, such as the date and time of the program, is encoded in the signal containing the advertisement) then the television broadcast source transmits an indicator identifying the advertised television program as recordable. The remainder of the procedure of FIG. 4 presumes that the advertised television program is recordable.

Since the program is recordable, the broadcast source encodes information about the future television program into the broadcast signal (step 252), such as the date, time, channel, and duration of the advertised television program. Additionally, information such as a content rating, actors and actresses appearing in the program, and a brief summary of the program can be encoded and transmitted along with the broadcast signal.

Alternatively, the broadcast source encodes a program identifier associated with the future television program in the broadcast signal. This program identifier replaces the information about the future television program (such as the date, time, channel, and duration of the program). The program identifier (for example, a code) indicates to the receiver that the future television program can be recorded. The receiver is able to interpret the program identifier and determine how to record the future television program.

A receiver (such as receiver 200) receives the advertised television program, including the encoded information (step 254). The receiver displays the advertisement and decodes the information from the advertised television program and displays a prompt to the viewer. The prompt asks the viewer if they would like to select the advertised television program for recording on a video recorder (step 256), such as DVR 204 shown in FIG. 2. The viewer then decides whether they want to record the advertised program. The viewer indicates whether they want to record the advertised program using a remote control device or other user input mechanism.

If, after a predetermined time period, the viewer does not indicate whether to record the advertised television program, then the prompt is automatically removed from the television. For example, a timeout period of fifteen seconds requires a user to indicate whether the advertised program should be recorded within fifteen seconds. Otherwise, the prompt is removed from the television. If the advertisement for the future television program ends before the timeout period is reached, then the prompt is automatically removed from the television.

If the viewer requests recording of the advertised program, then the receiver automatically programs the video recorder to record the advertised program at the appropriate day and time (step 260). Thus, the viewer is not required to remember the date or time of the advertised program because the receiver handles the programming of the video recorder. The video recorder is programmed using the date, time, channel, and duration information decoded from the television broadcast signal. The appropriate sequence of programming commands is generated and communicated to the video recorder. The actual programming commands may vary depending on the set of commands supported by the video recorder. After the video recorder is programmed, the prompt is removed from the television (step 262). In particular embodiments, the receiver generates and displays a confirmation to the viewer indicating that the advertised program will be recorded. If the viewer requests not to record the advertised program, then the prompt is removed from the television and the video recorder is not programmed.

The various information encoded in the broadcast signal regarding the advertised program may be contained in a template. For example, a template may include a title field, a description field, a date/time filed, a channel field, and any other fields necessary to describe the advertised television program. The template may also contain information indicating whether the viewer should be offered the option of recording the advertised program or setting a reminder associated with the advertised program.

In a particular embodiment, the broadcaster of the advertised television program may designate a particular program to be recorded automatically if the receiver (or a video recorder coupled to the receiver) has sufficient storage space to record the program. Additionally, the viewer may select certain television programs or "program types" that are always recorded (without prompting) if sufficient storage space is available. A program type may indicate, for example, a program title, program subject matter, or other program characteristic. For example, a program type may be any program having a subject matter relating to motorcycle racing. In another example, the program type is any program with a title "The Great Outdoors". If an advertised television program is designated to be recorded automatically, the system will not display a prompt asking the viewer if they would like to record the program. Instead, the video recorder is automatically programmed to record the television program if adequate storage space is available.

If a particular advertised television program is designated to be automatically recorded, but storage space is not sufficient to record the program, the television receiving system may delete programs from the video recorder. For example, the television receiving system may automatically delete recorded programs that have already been viewed or speculatively recorded programs. Speculatively recorded programs are programs that the viewer did not specifically request to record, but are likely to be of interest to the viewer based on the viewing habits or viewing preferences of the viewer. For example, a viewer may regularly watch movies starring a particular actor. A movie starring the particular actor may be automatically recorded based on the likelihood (or speculation) that the viewer would like to watch the movie.

The broadcaster of an advertised television program may associate a priority with each advertisement. A high priority program has a greater likelihood of being recorded than a low priority program. For example, a high priority program may cause the deletion of previously recorded programs from the video recorder to release storage space to record the high priority program. In contrast, a low priority program may not be recorded unless the video recorder has a significant amount of free storage space. The advertiser of the television program may pay different rates for each program that is recorded. For example, the advertiser pays a higher rate for each high priority program that is recorded and a lower rate for each low priority program that is recorded.

Figure 5A:
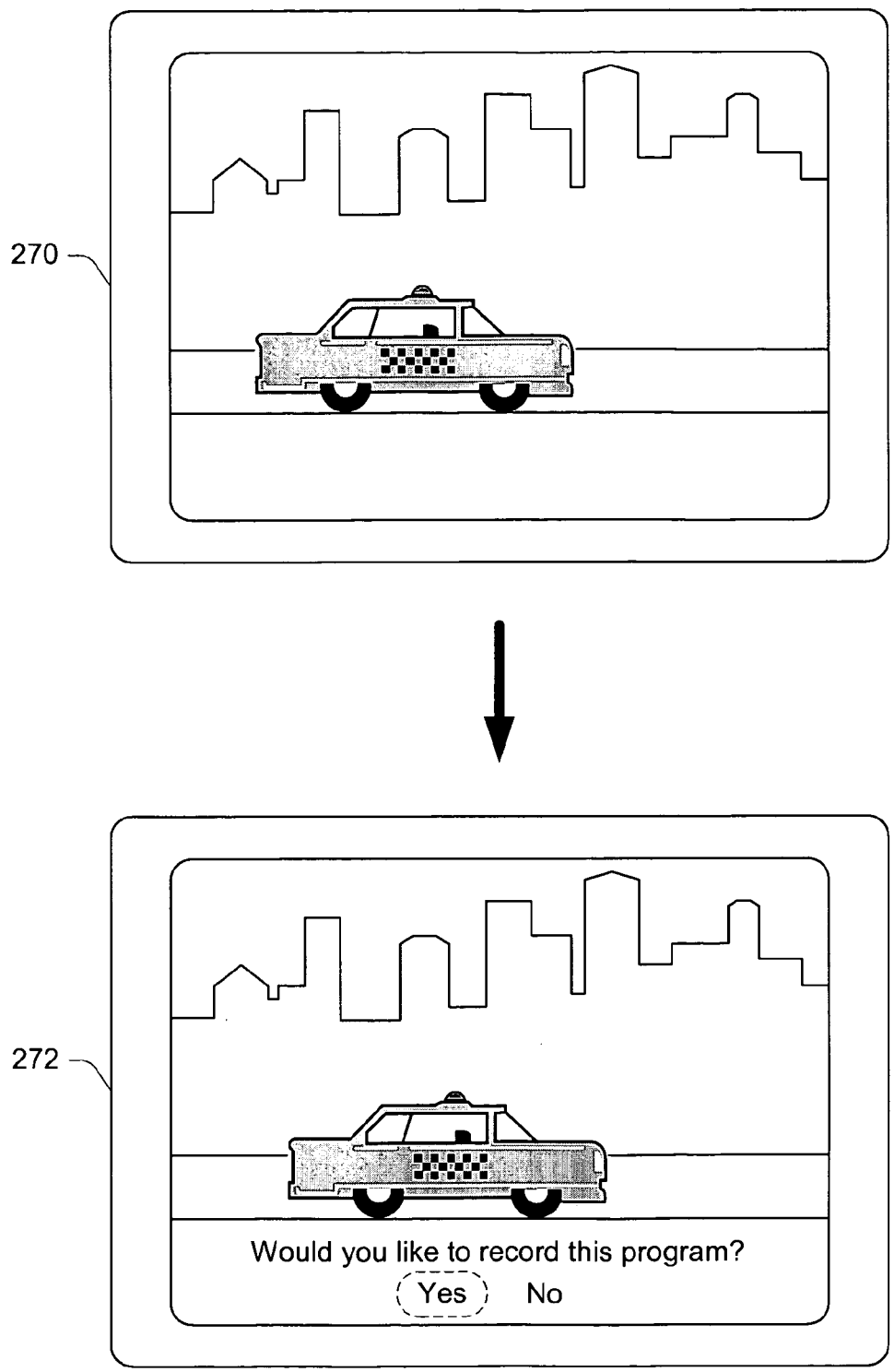
FIG. 5A illustrates an advertisement for a television program before and after a prompt is displayed to the television viewer.

FIG. 5A illustrates an advertisement for a television program before and after a prompt is displayed to the television viewer. A first image 270 illustrates an advertised television program without the display of a prompt. A second image 272 illustrates the same advertised program with a prompt asking the viewer if they would like to record the advertised program. The viewer selects "Yes" or "No" using a remote control device or other input mechanism. The location of the prompt on the television screen may be adjusted depending on the advertisement. Typically, the location of the prompt is determined by editors or creators of the advertisement. The location of the prompt may be selected to minimize the obstruction of important parts of the advertised program.

In the example of FIG. 5A, the bottom of the screen provides an unobstructed area to display the prompt. In other embodiments, the prompt may be displayed in another location of the screen that allows the viewer to easily read and respond to the prompt. Although not shown in FIG. 5A, additional information about the advertised program can be displayed along with the prompt. This additional information includes, for example, the title of the advertised program and a brief summary of the program. In one embodiment, information about the advertised television program as well as an indicator that the advertised program is available for recording is broadcast as part of the television signal using the Advanced Television Enhancement Forum (ATVEF) specification version 1.1 (draft version) or any subsequent versions of the specification.

In another embodiment, the viewer of an advertised program can set a reminder associated with the advertised program. The procedure for setting a reminder is similar to the procedure discussed above with respect to FIG. 4 for selecting to record the advertised program. Setting a reminder causes a notification to be displayed on the television (or other display device) at a predetermined time before the start of the associated television program. For example, a reminder notification can be displayed five minutes before the start of the associated program. Thus, instead of recording the advertised television program, the viewer is provided with a reminder notification shortly before the program is scheduled to be broadcast. This reminder notification eliminates the need for the viewer to remember the date, time, and channel of the advertised program. If the viewer is watching a program on a different channel, the reminder notification will remind the viewer to change channels prior to the start of the advertised program. When the reminder notification is displayed, the viewer may also be given the opportunity to record the program. This is particularly useful if the viewer is in the middle of watching another television program, but also wants to watch the program identified in the reminder notification.

In a particular embodiment, information associated with the reminder notification is stored in a receiver, such as receiver 200. In alternate embodiments, the reminder notification provides an option to automatically switch to the appropriate channel at the start of the advertised program. In one embodiment, an indicator that a reminder can be set for the advertised program is broadcast as part of the television signal using the ATVEF specification version 1.1 (draft version) or any subsequent versions of the specification.

In a particular embodiment, the viewer of an advertised program is offered the option of either setting a reminder associated with the advertised program or recording the advertised program on a video recorder. If the viewer selects a reminder, then a reminder operation is programmed in the receiver. If the viewer selects to record the advertised program, then a record operation is programmed on the video recorder.

Figure 5B:
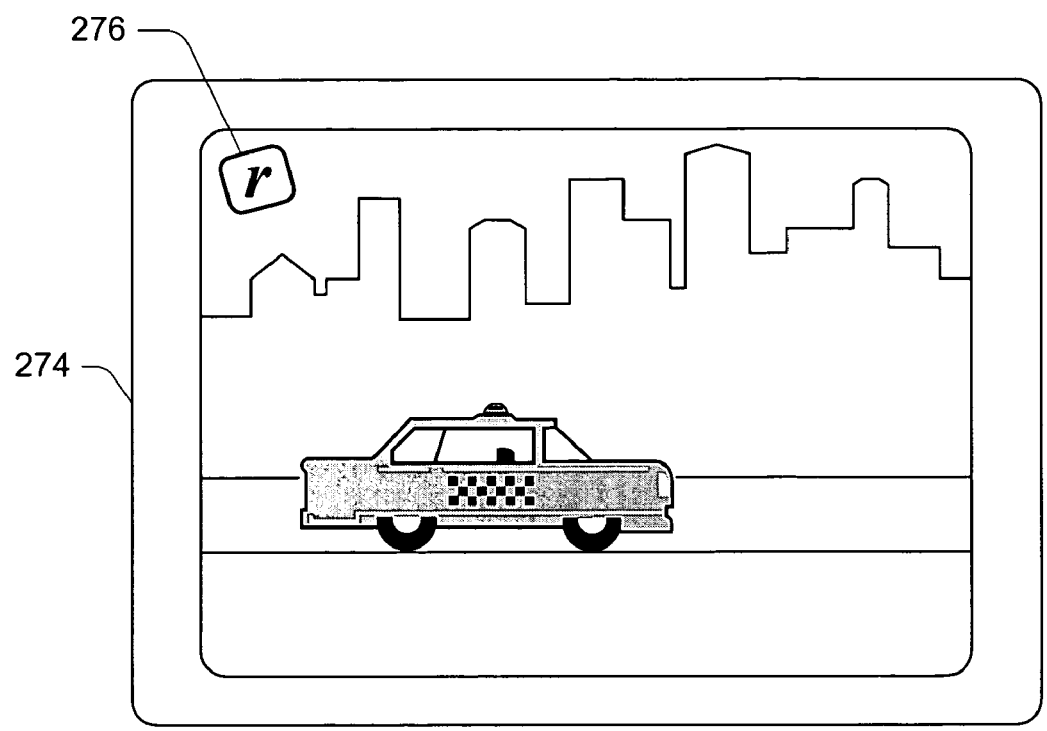
FIG. 5B illustrates an advertisement for a television program with an alternate prompt.

FIG. 5B illustrates an advertisement for a television program with an alternate prompt. An image 274 illustrates the same advertised program as image 270 in FIG. 5A, but includes a prompt (or icon) 276 in the upper-left corner of the image. The prompt 276 provides a less obtrusive indicator to the viewer that the advertised program is available for recording. The "r" in the prompt 276 indicates that recording is available, while other letters in a similar prompt may indicate other features or interactive modes. If the viewer wants to record the advertised program, they activate an appropriate button on a remote control or similar input device. For example the remote control may include a button that matches the design of prompt 276.

In another embodiment of the invention, the television receiving system 108 (FIG. 1) is used to access one or more web pages on a server coupled to the Internet. As the user of system 108 is viewing a web page, an advertisement for a future television program (such as a banner ad) is displayed on the web page. The program advertisement includes a prompt (such as a button or the prompt 276 shown in FIG. 5B) to indicate that the advertised program is available for recording. If the user selects the prompt (for example, by activating a mouse button while a pointer or cursor is located over the prompt), the video recorder is automatically programmed to record the advertised program. Information about the advertised program (time, date, etc.) may be encoded in the advertisement or retrieved from a web page associated with the advertised program.

Figure 6:
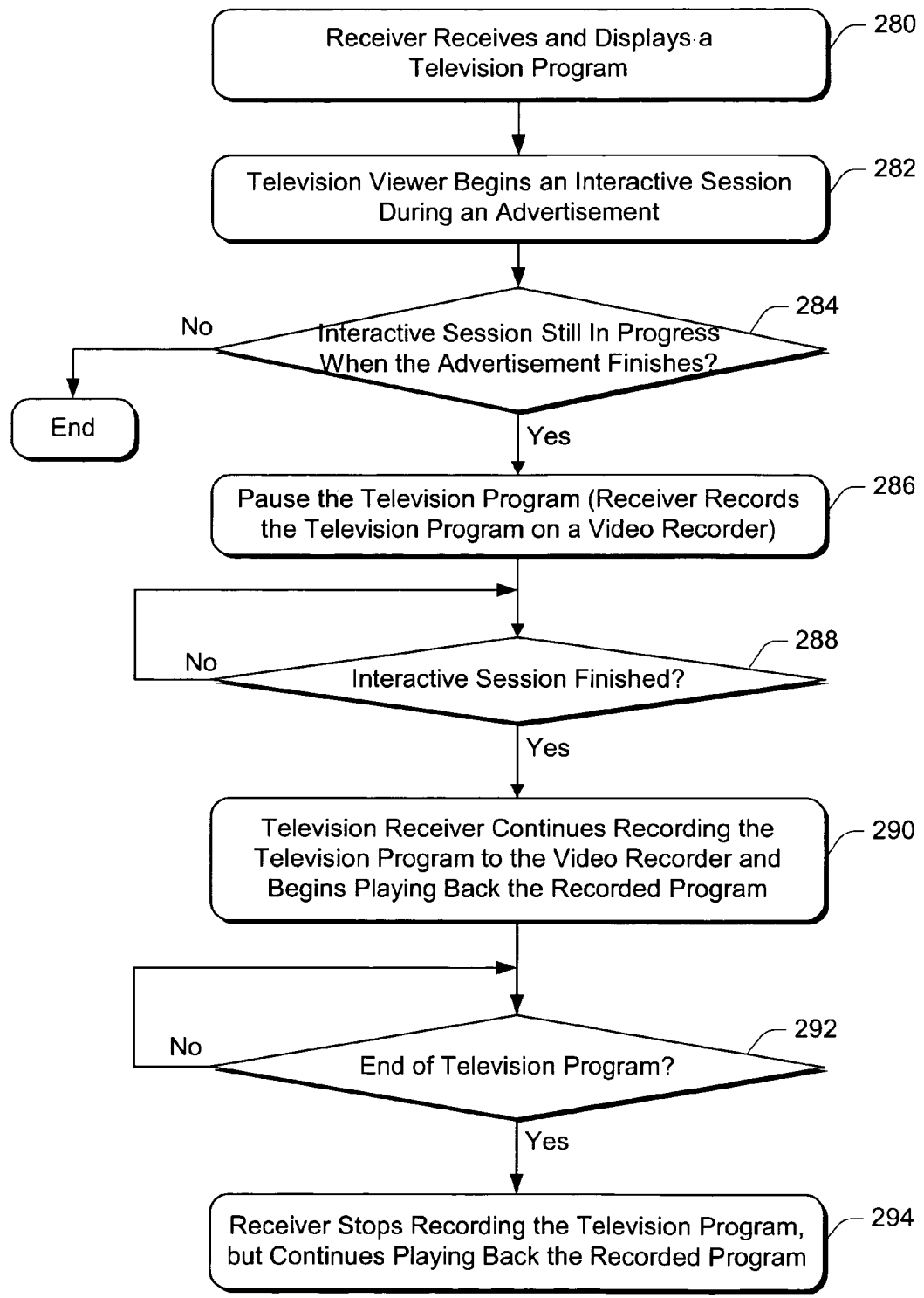
FIG. 6 is a flow diagram illustrating a procedure for pausing a television program.

FIG. 6 is a flow diagram illustrating a procedure for pausing a television program. A receiver receives an displays a television program broadcast by a television broadcast source (step 280). During the broadcast of an advertisement (e.g., a commercial), an interactive session is offered to the viewer. For example, this interactive session may provide an opportunity for the viewer to request additional information about an advertised product or service. An interactive session allows the television viewer to provide data to a television broadcast source. Two separate communication links are typically used to support the interactive session. A first communication link allows the viewer to receive information from a television broadcast source. A second communication link (such as a data communication network) allows the viewer to transmit information to the broadcast source or some other data recipient.

Still referring to FIG. 6, the television viewer begins an interactive session during an advertisement at step 282. If the interactive session is still in progress when the advertisement is finished, then the television program is paused by recording the television program on a video recorder (step 286). In a particular embodiment, the video recorder is a DVR or similar device that can read from and write to any portion of the disk drive in a random manner. If the interactive session is complete when the advertisement is finished, then the television program is displayed without any pause.

When the interactive session is finished, the receiver continues recording the television program using the video recorder and begins playing back the recorded program (step 290). At the end of the television program, the receiver stops recording the television program on the video recorder, but continues playing back the recorded program (step 294). When playback of the recorded program finishes, the recorded program can be saved on the video recorder for later viewing or erased to release storage space on the video recorder.

The following situation provides an example of the procedure illustrated in FIG. 6. A television viewer is watching a movie that is being broadcast from a television broadcast source. Several commercials are broadcast during the movie. The viewer is interested in a particular commercial that is advertising a new type of car. The viewer initiates an interactive session to request additional information about the car. During the interactive session, the viewer is asked to provide a name and mailing address to send a product brochure. The viewer may also be asked to provide additional information such as their age, occupation, and what feature of the car attracted their attention. The commercial may end (and the movie resumes) before the viewer can enter all of the requested information. Instead of requiring the viewer to either abandon entry of the requested information or miss a portion of the movie, the receiver automatically pauses the television by recording the movie on a video recorder. After the viewer has entered all of the requested information and the interactive session is closed, the saved movie automatically begins playing form the video recorder. Thus, the viewer is able to complete the interactive session without missing any part of the movie.

Thus, a system has been described that allows the viewer of an advertisement for a future television program to automatically program a video recorder to record the advertised program. Additionally, the viewer can set a reminder associated with the advertised program. The described system also automatically pauses a television program, if necessary, to allow a viewer to finish entering data during an interactive session.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method comprising:
   receiving a signal containing an advertisement video program for a future video program;
   displaying the advertisement video program on a display device having an available display area for display of video programs, wherein the displayed advertisement video program occupies the available display area of the display device;
   determining whether the signal contains an indicator identifying the future video program as recordable; and
   when the signal contains the indicator that the future video program is recordable:
      responsive to the indicator in the signal automatically and without viewer input, displaying an option to record the future video program while displaying the advertisement video program, wherein the video image of the advertisement video program includes content from the future video program; and
      programming a record operation if a viewer selects the option to record the future video program.

2. A method as recited in claim 1 wherein the advertisement video program is displayed during a current television program.

3. A method as recited in claim 1 wherein programming a record operation includes automatically programming a video recorder to record the future video program at an appropriate time.

4. A method as recited in claim 1 wherein programming a record operation includes automatically programming a video recorder to record the future video program at an appropriate time if the video recorder has sufficient storage space to record the future video program.

5. A method as recited in claim 1 wherein the option to record the future video program is displayed as part of the advertisement video program.

6. A method as recited in claim 1 further including decoding information associated with the future video program from the received signal containing the advertisement video program.

7. A method as recited in claim 1 further including removing the displayed option to record the future video program after a predetermined period of time.

8. A method as recited in claim 1 further including removing the displayed option to record the future video program at the end of the advertisement video program.

9. A method as recited in claim 1 further including displaying a confirmation notice if the viewer selects the option to record the future video program, wherein the confirmation notice indicates that the future video program will be recorded.

10. One or more computer-readable memories containing a computer program that is executable by a processor to perform the method recited in claim 1.

11. A method comprising:
    receiving a signal containing an advertisement television program for a future television program, wherein the video image of the advertisement television program includes content from the future video program;
    displaying the advertisement television program on a display device having an available display area for display of television programs, wherein the displayed advertisement television program occupies the available display area of the display device;

determining whether the signal contains an indicator identifying the future television program as recordable; and if the signal contains an indicator that the future television program is recordable, then automatically and without viewer intervention programming a record operation to record the future television program.

12. A method as recited in claim 11 wherein programming a record operation includes automatically programming a video recorder to record the future television program at an appropriate time.

13. A method as recited in claim 11 wherein programming a record operation includes automatically programming a video recorder to record the future television program at an appropriate time if the video recorder has sufficient storage space to record the future television program.

14. One or more computer-readable memories containing a computer program that is executable by a processor to perform the method recited in claim 11.

15. A method comprising:
broadcasting an advertisement television program for:
a future television program during a current television program; and
display on a display device having an available display area for display of television programs, wherein the displayed advertisement television program includes one or more video images from the future video program and occupies the available display area of the display device;
broadcasting an indication that the future television program is recordable during the advertisement television program, the indication configured to automatically and without viewer intervention cause display of a viewer selectable option to record the future video program on the display device; and
broadcasting information associated with the future television program, wherein the information associated with the future television program is encoded in a television signal containing the advertisement television program for the future television program.

16. A method as recited in claim 15 wherein the information associated with the future television program identifies the date, time, and channel of the future television program.

17. A method as recited in claim 15 further including broadcasting information that identifies a summary of the future television program.

18. One or more computer-readable memories containing a computer program that is executable by a processor to perform the method recited in claim 15.

19. An apparatus comprising a receiver configured to receive a television broadcast signal that contains an advertisement television program for a future television program and for display on a display device having an available display area for display of television programs, wherein the displayed advertisement television program occupies the available display area of the display device and includes one or more images from the future television program, wherein the receiver determines whether the television broadcast signal contains an indicator identifying the future video program as recordable and responsive to the indicator the receiver causes the display device to display automatically and without viewer intervention an option to record the future television program while displaying the one or more images from the future television program if the future television program is recordable, and wherein the receiver programs a record operation if a viewer of the display device selects the option to record the future television program.

20. An apparatus as recited in claim 19 wherein the receiver decodes information associated with the future television program from the television broadcast signal.

21. An apparatus as recited in claim 20 wherein the decoded information includes the date, time, and channel of the future television program.

22. One or more computer-readable media having stored thereon a computer program comprising the following steps:
displaying an advertisement television program for a future television program, wherein the advertisement television program:
includes one or more video images directly related to the future television program;
is contained in a received signal; and
for display on a display device having an available display area for display of television programs such that the displayed advertisement television program occupies the available display area of the display device;
determining whether the received signal contains an indicator identifying the future television program as recordable;
if the signal contains the indicator that the future television program is recordable:
displaying automatically and without viewer intervention an option to record the future television program; and
programming a record operation on a video recorder if a viewer selects the option to record the future television program.

23. One or more computer-readable media as recited in claim 22 wherein the step of programming a record operation includes automatically programming the video recorder to record the future television program at an appropriate time.

24. One or more computer-readable media as recited in claim 22 further including the step of decoding information associated with the future television program from a television signal containing the advertisement television program.

25. One or more computer-readable media having stored thereon a computer program comprising the following steps:
broadcasting an advertisement video program configured as an advertisement for and having content from a future video program and for display on a display device having an available display area for display of television programs such that the displayed video program occupies the available display area of the display device;
broadcasting during display of the advertisement video program an indication that the future video program is recordable, the indication configured to automatically and without viewer intervention cause display of a viewer selectable option to record the future video program on the display device; and
broadcasting information associated with the future video program, wherein the information associated with the future video program is encoded in a signal containing the advertisement video program.

26. One or more computer-readable media as recited in claim 25 wherein the information associated with the future video program includes the date, time, and channel of the future video program.

27. One or more computer-readable media as recited in claim 25 further including the step of broadcasting information that identifies a summary of the future video program.

* * * * *